US010245936B2

(12) United States Patent
Gillett

(10) Patent No.: US 10,245,936 B2
(45) Date of Patent: Apr. 2, 2019

(54) POWERED SKATEBOARD SYSTEM

(71) Applicant: Carla R. Gillett, Sacramento, CA (US)

(72) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 54 days.

(21) Appl. No.: 15/379,474

(22) Filed: Dec. 14, 2016

(65) Prior Publication Data

US 2017/0106739 A1   Apr. 20, 2017

Related U.S. Application Data

(62) Division of application No. 13/872,054, filed on Apr. 26, 2013, now Pat. No. 9,586,471.

(51) Int. Cl.
*B60K 7/00* (2006.01)
*A63C 17/12* (2006.01)
(Continued)

(52) U.S. Cl.
CPC .......... *B60K 7/0007* (2013.01); *A63C 17/014* (2013.01); *A63C 17/12* (2013.01); *B60B 19/003* (2013.01); *B60K 17/30* (2013.01); *B60K 31/0058* (2013.01); *B60L 11/1822* (2013.01); *B60W 50/082* (2013.01); *B62J 99/00* (2013.01); *B62K 5/08* (2013.01); *B62K 11/007* (2016.11); *B62K 11/02* (2013.01); *B62K 17/00* (2013.01); *B62K 21/12* (2013.01); *B62K 21/26* (2013.01); *B62K 23/02* (2013.01); *B62K 25/02* (2013.01);
(Continued)

(58) Field of Classification Search
CPC .......... B60K 7/0007; B60K 2007/0092; B60K 17/30; B60K 7/007; B60K 31/0058; A63C 17/014; A63C 17/015; A63C 17/12; A63C 2203/12; B60Y 2200/91; B60B 19/003; B60L 11/1822; B60W 50/082; B62J 99/00; B62K 11/007; B62K 5/08; B62K 11/02; B62K 17/00; B62K 21/12; B62K 21/26; B62K 23/02; B62K 25/02; G05D 1/0016; G05D 1/0088; G05D 1/0231; G05D 1/0257; G05D 1/0276; G05D 1/0278
USPC ...................... 180/167; 280/87.042
See application file for complete search history.

(56) References Cited

U.S. PATENT DOCUMENTS

| 5,950,754 A * | 9/1999 | Ondrish, Jr. ........ A63C 17/01 180/180 |
| 7,053,288 B2 * | 5/2006 | Iwai ........ A63C 5/06 280/87.042 |

(Continued)

*Primary Examiner* — John D Walters

(57) ABSTRACT

A powered skateboard system comprising a skateboard deck having a top surface for supporting a rider of the powered skateboard, a bottom surface configured to facilitate engagement with one or more inner-motorized trucks and a compartment adapted to store one of more components including a control system, and one or more battery packs for a primary, and a secondary back up power source. The control system comprising methodologies configured to control the power of the one or more inner-motorized trucks. The control system provides a means to control the powered skateboard by using a wireless handheld controlled, or a wireless phone device including touchscreen gesturing control having one or more motion control buttons and toggle switches also, configured to transmit and to receive information associated with the operation of the inner-motorized trucks.

14 Claims, 5 Drawing Sheets

(51) Int. Cl.

| | | |
|---|---|---|
| | *B60K 17/30* | (2006.01) |
| | *B60K 31/00* | (2006.01) |
| | *G05D 1/02* | (2006.01) |
| | *B62K 11/00* | (2006.01) |
| | *B60B 19/00* | (2006.01) |
| | *B62K 25/02* | (2006.01) |
| | *G05D 1/00* | (2006.01) |
| | *A63C 17/01* | (2006.01) |
| | *B60L 11/18* | (2006.01) |
| | *B60W 50/08* | (2012.01) |
| | *B62J 99/00* | (2009.01) |
| | *B62K 5/08* | (2006.01) |
| | *B62K 11/02* | (2006.01) |
| | *B62K 17/00* | (2006.01) |
| | *B62K 21/12* | (2006.01) |
| | *B62K 21/26* | (2006.01) |
| | *B62K 23/02* | (2006.01) |

(52) U.S. Cl.
CPC ......... *G05D 1/0016* (2013.01); *G05D 1/0088* (2013.01); *G05D 1/0231* (2013.01); *G05D 1/0257* (2013.01); *G05D 1/0276* (2013.01); *G05D 1/0278* (2013.01); *A63C 2203/12* (2013.01); *B60K 2007/0038* (2013.01); *B60K 2007/0092* (2013.01); *B60L 2200/12* (2013.01); *B60W 2420/52* (2013.01); *B60W 2710/20* (2013.01); *B60Y 2200/91* (2013.01); *B62J 2099/004* (2013.01); *B62J 2099/0013* (2013.01); *B62K 2204/00* (2013.01); *B62K 2207/00* (2013.01); *B62K 2207/02* (2013.01); *B62K 2207/04* (2013.01); *B62K 2700/22* (2013.01); *G05D 2201/0206* (2013.01)

(56) References Cited

U.S. PATENT DOCUMENTS

| | | | | |
|---|---|---|---|---|
| 2005/0006158 | A1* | 1/2005 | Tsai | A63C 17/12 180/167 |
| 2007/0034433 | A1* | 2/2007 | Gabriele | A63H 30/04 180/167 |
| 2010/0222941 | A1* | 9/2010 | Chang | A63C 17/015 701/2 |

* cited by examiner

400 POWERED SKATEBOARD CONTROL SYSTEM

401. The powered skateboard control system 400 of the inner-motorized skateboard truck 100A and 100B, the control system 400 comprising methodologies control system communicates instruction data and receives data respectively from microprocessors configured to control the power of the one or more inner-motorized trucks 300A and 300B of the powered skateboard control system 400; a control method to synchronize trajectory momentum and braking actions as operator traverses to steer the skateboard;

402. The hub wheel 302 assembly comprises a treaded or an inflated or non-inflated tire 301 mounted about the rim, a drive motor 303 supported by at least one axle rod 304 and at least one hub 305, the hub 305 configured to attach to a yoke module 306 comprising hollow conduit 307 which can be configured to facilitate passage of an electrical wire 308 there through allowing connection to components;

403. The inner-motorized truck 300 is configured with a yoke module 306 along with at least one hub 305 having lug nut and bolt 310 which supports the hub wheel 302 securely. The yoke module 306 is attached to the hub wheel 302 assembly respectively the connection spaced from the axis rod 304 of rotation of the hub wheel 302, the hub is securely coupled thereon by means of lug bolts 310a, 310b;

404. The wire connections 309 are disposed between the powered skateboard control system 400 a plurality of operation sensors 408 and microprocessors 409 for controlling synchronizing trajectory momentum 410, control braking actions 411 and traverse actions to steer 412 the powered skateboard, and the battery system of the inner-motorized trucks of the powered skateboard deck 100;

405. The battery packs 200 configured for a primary and a secondary back up power source of the inner-motorized trucks of the powered skateboard 100, and comprising a battery charging device 200 and a battery charging controller associated with a charge level of a battery used to power the one or more inner-motorized trucks 300;

406. The handheld wireless control device 413 comprising one or more motion control buttons and toggle switches for controlling the power of the one or more inner-motorized trucks 300, the handheld wireless control device 413 further comprising a cylinder shape and having a preferred make, and also the handheld wireless control device is comprising a transmitter 415 and a receiver 416 configured to transmit and to receive information 417 associated with the operation of the one or more inner-motorized trucks 300;

407. The wireless phone device 414, comprising one or more touchscreen gesturing motion control buttons and toggle switches for controlling the power and operation of the one or more inner-motorized trucks 300 and a safety mechanism kill switch 410 to shut off the inner-motorized truck's drive motors; the wireless phone device 414 further comprising a preferred make and shape to include microprocessors and sensors for controlling synchronizing trajectory momentum, and control braking actions and traverse actions to steer, and comprising a transmitter 415 and a receiver 416 configured to transmit and to receive information associated with the operation of the one or more inner-motorized trucks 300 of the powered skateboard control system 400.

FIG. 4

POWERED SKATEBOARD SYSTEM

CROSS REFERENCED TO RELATED APPLICATIONS

A notice of issuance for a divisional patent application in reference to application Ser. No. 13/872,054; filing date: Apr. 26, 2013, title: "Robotic Omniwheel", and in reference to patent application Ser. No. 12/655,569; title: "Robotic Omniwheel Vehicle" filing date: Jan. 4, 2010, U.S. Pat. No. 8,430,192 B2.

TECHNICAL FIELD

The present disclosure relates to skateboards and in particular to the powered skateboards composition, and also to wireless control methodology utilizing a hand held remote control device and a wireless phone device to control one or more inner-motorized truck operations.

BACKGROUND

Skateboards typically include an elongated board, sometimes referred to as a deck, having an upper surface and a lower surface. The upper surface typically supports the feet of a rider of the skateboard and the lower surface typically have two trucks attached to the skateboard deck disposed toward either end of the deck. The upper surface may support the rider who is standing on the skateboard.

As the demand for powered skateboards increases so too does the need for a more efficiently structured frame housing or "deck" respectively, the present invention offers a highly efficient skateboard deck offering an interchangeable battery pack compartment situated either on top of the deck or the under the deck.

Present day skateboards typically require the rider to provide the propelling force to move the skateboard or utilize a propulsion system comprising a belt drive motorized system placed on the rear of the deck and accordingly an example control method may be that of a tethered power cord allowing an operator to manually control navigational operations and speed at which the belt drive motor rotates and brakes. The operator can manually control navigational operations by using a common manual throttle like joystick or a handheld control device.

SUMMARY

The present invention provides a powered skateboard comprising inner-motorized trucks, the frame construction of the powered skateboard is configured have a top surface for supporting at least one skateboard operator. The skateboard deck lower portion further comprising a control system which communicates instruction data and receives data respectively from the inner-motorized truck microprocessors and as a result, providing all-wheel drive torque and horsepower to drive up steep hills. Accordingly one or more components housed in the skateboard deck can include a power source comprising a control system, the control system has a safety mechanism kill switch to shut off the inner-motorized truck modules comprising drive motors, thusly the operator selects preferred control methods to adjust power levels of the skateboard hub motors by using a wireless hand held controller or using a wireless phone device respectively, each method synchronizes trajectory momentum and braking actions whilst the operator traverses to steer the skateboard.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

FIG. 4 is a schematic flowchart for the powered skate control system truck in accordance with the present disclosure.

DETAILED DESCRIPTION OF THE DRAWINGS

A powered skateboard 100 system, comprising a skateboard having a top surface deck 101 for supporting a rider or operator 600 of the powered skateboard 100. The powered skateboard deck further comprising a bottom surface configured to facilitate engagement with one or more powered skateboard trucks 300, and a compartment in situated in the bottom surface of the skateboard deck 101.

Figure 1A:
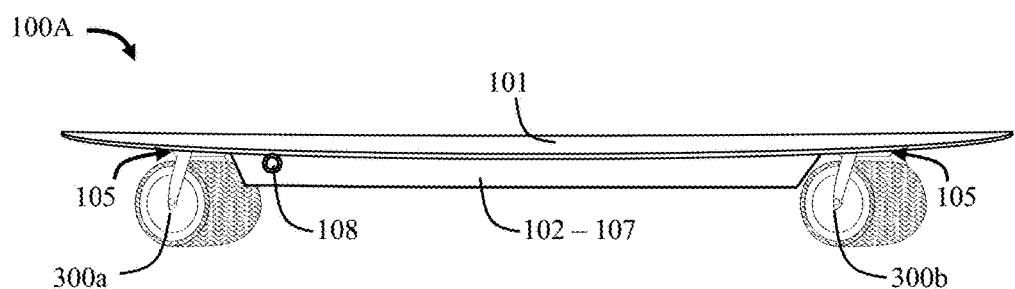
FIG. 1 A and FIG. 1B schematically illustrates a powered skateboard deck 100A and 100B in accordance with the present disclosure.
Figure 1B:
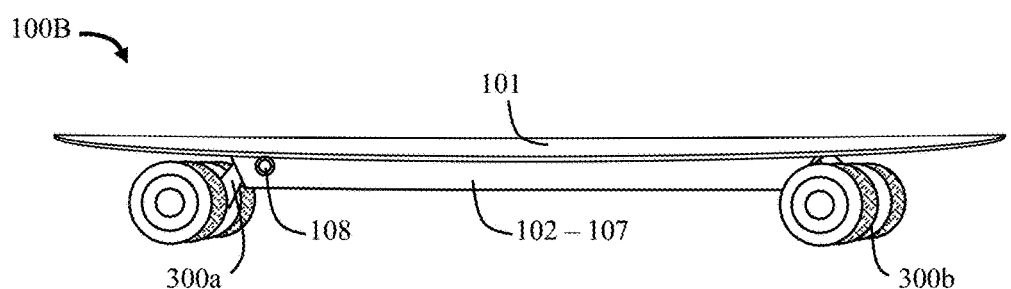
Figure 3A:
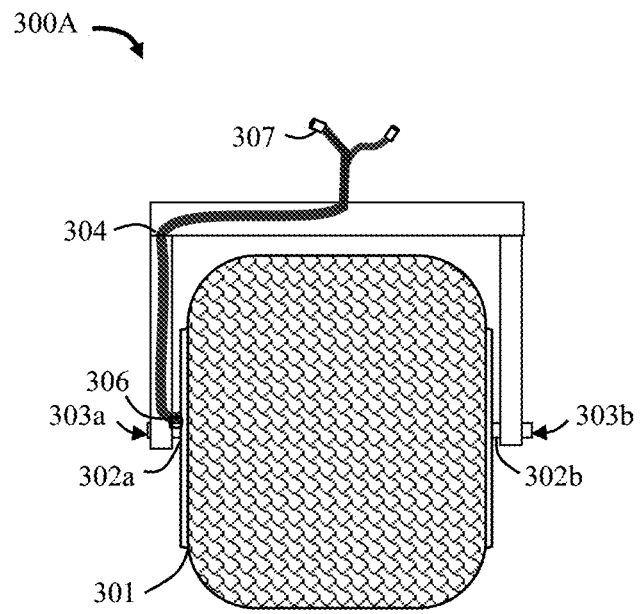
FIG. 3A and FIG. 3B schematically illustrates the powered skateboard bottom and battery compartment truck in accordance with the present disclosure.
Figure 3B:
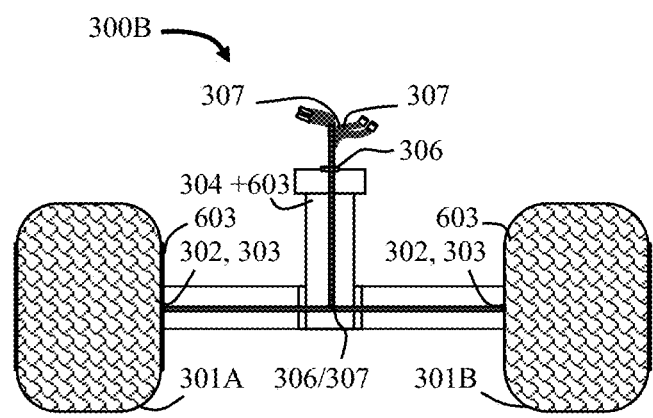

In further detail FIG. 1A is a schematic view of a powered skateboard 100A, and FIG. 1B further details a view of powered skateboard 100B and both powered skateboard having deck 101 comprising a preferred shape and length, and respectively the bottom portion of the skateboard or deck bottom 102 is suitable to fit between front and back inner-motorized trucks 300, the truck can be a single wheel truck as shown in FIG. 1A configured with a fork yoke module 300A as detailed in FIG. 3A or a truck 300B configured having a wide axle supporting to opposing electric powered hub wheels as detailed in FIG. 3B.

In one embodiment the powered skateboard deck 101, respectively the skateboard deck can be configured to support one or more electrical components wired to the front and back inner-motorized trucks 300A/B via wire connections 108 and plugs 109.

Figure 2A:
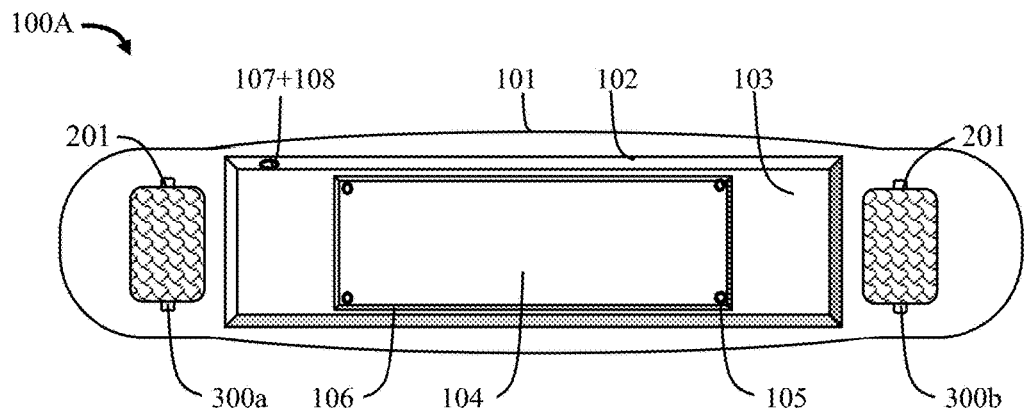
FIG. 2A and FIG. 2B schematically illustrates an inner-motorized truck 300A and 300B in accordance with the present disclosure.
Figure 2B:
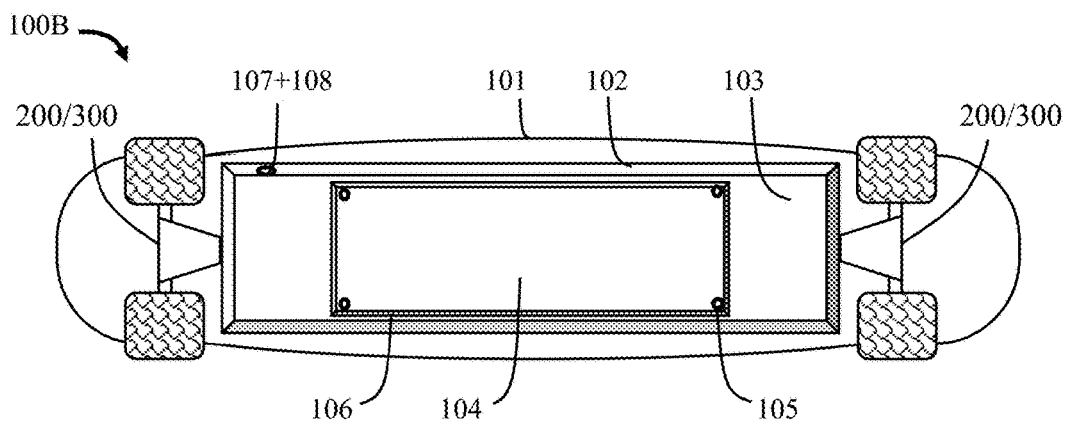

In further detail FIG. 2A and FIG. 2B show schematic views of the skateboard's bottom surface being configured to facilitate engagement of one or more inner-motorized trucks 300A and 300B, and respectively one embodiment a removable compartment cover can be configured to cover the opening formed by the compartment in the bottom surface of the powered skateboard 100A/B. In various aspects the compartment adapted to store one of more components such as one or more battery packs and various control system components.

Accordingly in a preferred embodiment the control system is comprising methodologies configured to control the power of the one or more powered skateboard trucks 300A/300B each truck comprising electric hub wheel assemblies including at least that of; axis, gears, bearings, tire, pre-wired cable with connection, or the like.

In various aspects one or more wire connections are disposed between the control device of the inner-motorized truck 300A/B and the powered skateboard deck 101, the truck and deck being pre-wired connections, the control system components and motion sensors wiring is contained within the compartment.

In one aspect, the powered skateboard 100A/B can comprise an elongated shape of the skateboard deck 101. The skateboard deck 101 can comprise a bottom portion 102 having truck mounting portions (shown by arrows 201) configured to facilitate engagement with one or more inner-motorized trucks 300A/300B. The skateboard deck 101 can be secured to the bottom portion 102 by one or more of screws 105, and adhesive, welding, mechanically fastening, and/or other securing means.

In a preferred fabrication method the inner-motorized trucks 300A/B are fixed on the bottom surface are fixed by means of bolts and bolts 105 and shown by arrows 201 in FIG. 2A and FIG. 2B.

In further detail FIG. 2A and FIG. 2B illustrate a schematic bottom view of the powered skateboard 100A/B comprising an assembly method battery packs 106, the battery packs 106 can comprise an outer case having substantially similar dimensions. The battery pack 106 can be configured to be removable from the compartment 103. For example, when a battery pack 106 has been depleted it can be exchanged for a charged battery pack 106, and as well, the battery pack 106 can be charged in between use via a battery charging device 107.

In various aspects one or more battery packs configured for a primary and a secondary back up DC power source of the powered skateboard 100, and comprising a battery charging device and a battery charging device 107 associated with a charge level of a battery used to power the one or more inner-motorized trucks 300.

As shown the bottom of the skateboard deck 101 comprising a removable compartment cover 104 configured to cover the opening formed by the compartment 103 in the bottom surface of the powered skateboard 102. The cover 104 is fastened to the compartment 103 rim by means of screws and nuts 105 or by using another closure method.

The battery charging device 107 comprises a method to plug in an AC power outlet 108 the cord can be plugged into the AC power outlet 108.

In further detail FIGS. 3A and 3B are see through views of an inner-motorized truck 300, as exampled FIG. 3A depicts a single wheel truck 300A and FIG. 3B depicts a dual wheeled truck 300B, and respectively the inner-motorized truck 300 examples comprises one or more rubber or inflated tires 301 mounted about the rim of a hub wheel 302, a drive motor 303 which is supported by at least one axle rod 304 and at least one hub 305, the hub 305 configured to attach to a yoke module 306 comprising hollow forked conduit 307 which can be configured to facilitate passage of an electrical wire 308 with connections 309 there through.

In one embodiment the inner-motorized truck 300A/B is comprising a drive motor 303 preferably an electric hub motor that is enclosed in the body of a hub wheel 302, accordingly hub wheel's assembly having linear motion perpendicular to the axis of rotation and parallel to the gravity line or least closing an oblique angle with the gravity line.

The inner-motorized truck 300A/B is configured with a yoke module 306 along with at least one hub 305 having lug nut and bolt 310 shown by arrows 201 which supports the hub wheel 302 securely. In one embodiment the yoke module 306 is attached to the hub wheel 302 assembly respectively the connection spaced from the axis rod 304 of rotation of the hub wheel 302, the hub is securely coupled thereon by means of lug bolts 310a, 310b.

In a preferred embodiment the inner-motorized truck 300A/B is prewired 308 in the fabrication process. A method of fabricating a powered skateboard comprising: a skateboard deck configured with a top surface for supporting a rider/operator; a bottom surface to facilitate engagement with one or more inner-motorized trucks and attaching an inner-motorized hub wheel to the skateboard truck; a compartment configured within a portion of the skateboard and a removable compartment cover can be configured to cover the opening formed by the compartment surface; the compartment for storing and to house: electrical wire and connections; a control system configured to for controlling the powered skateboard components; one or more batteries configured to provide power to the inner-motorized truck's hub wheel; and a battery charging controller associated with a charge level of a battery; and a means of the control system to control the DC power of the one or more inner-motorized powered skateboard trucks wirelessly via a phone device with touchscreen gesturing control means, or by a handheld control device; a powered skateboard control system configured to, at least, control the inner-motorized hub wheel based on a control signal received through a transceiver by means of one or more sensors and motion control devices to monitor vibration and motion of mechanical operations, and a control device configured to control speed and braking of one or more drive motors, and a powered skateboard assembled by one or more of screws, adhesive, welding, mechanically fastening, or other securing means; two powered skateboards assembled as a skate for pairing, each skate to include a shoe and skateboard components comprising: a removable compartment cover configured to cover the opening formed by the compartment in the bottom surface of the powered skate, the cover is fastened to the compartment rim by means of screws and nuts, and a battery charging device, with plug in, the pairing of skates employing electric inner-motorized trucks comprising hub motors with sufficient torque and horsepower to carry an operator, the operator utilizing wireless controllers, or the like; an inner-motorized truck configured with an inflated or non-inflated tire mounted about the rim of a hub wheel; and a hub motor comprising a drive motor including at least that of: one or more gears types, axle rods, hubs, bearings, bolting means, or the like; an inner-motorized truck configured with a drive motor supported by at least one axle rod and at least one hub; a hub configured to attach to a yoke module; the yoke module containing one or more wire connections disposed therein, and a sensor for monitoring mechanical operation; a hollow conduit to facilitate passage of an electrical wire with connections there through, and one or more wire connections disposed within conduit situated between the power control device and the components of the powered skateboard compartment; a means of the yoke module to attach to the hub wheel assembly respectively the connection spaced from the axis rod of rotation of the hub wheel, the hub is securely coupled thereon by means of lug bolts; and a drive motor preferably an electric hub motor that is enclosed in the body of a hub wheel, a truck configured having a fork yoke or having a wide axle supporting to opposing electric powered hub wheels having linear motion perpendicular to the axis of rotation and parallel to the gravity line or least closing an oblique angle with the gravity line.

In some variations, one or more sensing devices 414 can be disposed within the conduit 307; and accordingly, powered skateboard sensors 414 being configured to monitor vibration and mechanical operations such as; controlling synchronizing trajectory momentum via braking and traverse actions to steer the powered skateboard through an environment.

In further detail FIG. 4 shows a schematic flowchart for the powered skateboard control system 400:

401. The powered skateboard control system 400 of the inner-motorized skateboard truck 100, the control system 400 comprising methodologies control system communicates instruction data and receives data respectively from microprocessors configured to control the power of the one or more inner-motorized trucks 300 of the powered skateboard control system 400; a control method to synchronize trajectory momentum and braking actions as operator traverses to steer the skateboard;

402. The hub wheel 302 assembly comprises a treaded or an inflated or non-inflated tire 301 mounted about the rim of a hub wheel 302, a drive motor 303 supported by at least one axle rod 304 and at least one hub 305, the hub 305 configured to attach to a yoke module 306 comprising hollow conduit 307 which can be configured to facilitate passage of an electrical wire 308 there through allowing connection to components;

403. The inner-motorized truck 300 is configured with a yoke module 306 along with at least one hub 305 having lug nut and bolt 310 which supports the hub wheel 302 securely. The yoke module 306 is attached to the hub wheel 302 assembly respectively the connection spaced from the axis rod 304 of rotation of the hub wheel 302, the hub is securely coupled thereon by means of lug bolts 310a, 310b;

404. The wire connections 309 are disposed between the powered skateboard control system 400 a plurality of sensors 408 and microprocessors 409 for controlling synchronizing trajectory momentum 410, control braking actions 411 and traverse actions to steer 412 the powered skateboard, and the battery system of the inner-motorized trucks of the powered skateboard deck 100;

405. The battery packs 200 configured for a primary and a secondary back up power source of the inner-motorized trucks of the powered skateboard 100, and comprising a battery charging device 200 and a battery charging controller associated with a charge level of a battery used to power the one or more inner-motorized trucks 300;

406. The hand held wireless control device 413 comprising one or more motion control buttons and toggle switches for controlling the power of the one or more inner-motorized trucks 300, the hand held wireless control device further comprising a cylinder shape and having a preferred make, and also the hand held wireless control device is comprising a transmitter 415 and a receiver 416 configured to transmit and to receive information 417 associated with the operation of the one or more inner-motorized trucks 300;

407. The wireless phone device 414, comprising one or more touchscreen motion control buttons and toggle switches for controlling the power and operation of the one or more inner-motorized trucks 300, and a safety mechanism kill switch 417 to shut off the inner-motorized truck's drive motors; the wireless phone device 414 further comprising a preferred make and shape to include microprocessors 602 and sensors 603 for controlling synchronizing trajectory momentum 604, and control braking actions 605 and traverse actions to steer 606, and comprising a transmitter 415 and a receiver 416 configured to transmit and to receive information associated with the operation of the one or more inner-motorized trucks 300 of the powered skateboard control system 400.

In the present disclosure the skateboard however it is obvious to one skilled in the art the claims and specification are not limited, respectively two shorter skateboards can also work as skates to carry a rider 600.

Figure 5:
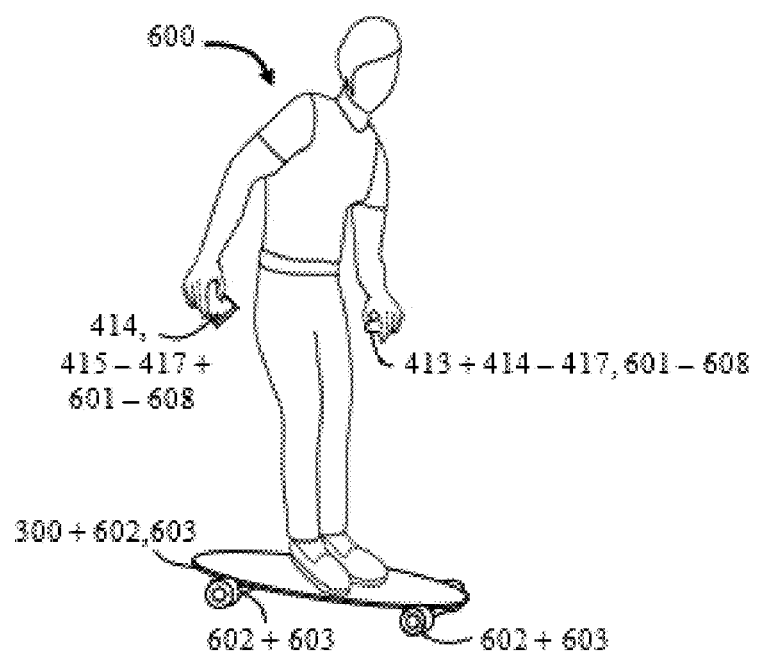
FIG. 5 illustrates a powered skateboard operator utilizing wireless control systems 413, 414 in accordance with the present disclosure.

Accordingly, FIG. 5 illustrates the operator 600 of the powered skateboard utilizing a handheld wireless control device or a wireless phone device 414 including touchscreen gesturing utilizing one or more touchscreen motion control buttons and toggle switches 601 for controlling the power of the inner-motorized powered skateboard trucks, the hand held wireless control device 413 further comprising a cylinder shape and having a preferred make to include microprocessors 602 and sensors 603 for controlling synchronizing trajectory momentum 604, and control braking actions 605 and traverse leg actions to steer 606, and comprising a transmitter 415 and a receiver 416 configured to transmit and to receive information 607 associated with the operation 608 of the one or more inner-motorized powered skateboard trucks.

Accordingly, the operator 600 utilizing a handheld wireless control device 413 or the wireless phone device 414 including touchscreen gesturing utilizing one or more touchscreen motion control buttons and toggle switches 601 for controlling the power level of the inner-motorized powered skateboard trucks, the handheld wireless control device 413 further comprising a cylinder shape and having a preferred make to include microprocessors 602 and sensors 603 for controlling synchronizing trajectory momentum 604, and control braking actions 605 and traverse leg actions to steer 606, and comprising a transmitter 415 and a receiver 416 configured to transmit and to receive information 607 associated with the operation 600 of the one or more inner-motorized powered skateboard trucks.

Following long-standing patent law convention, the terms "a", "an", and "the" refer to "one or more" when used in this application, including the claims.

Thus, for example, reference to "a sensor" includes a plurality of such sensors 603 for controlling synchronizing trajectory momentum 604, control braking actions 605 and traverse actions to steer 606, "a microprocessor" includes a plurality of operation 608 "microprocessors", and other operation sensors to wirelessly control a powered skateboard through an environment.

It further should be understood that certain steps could be performed simultaneously, that other steps could be added, or that certain steps described herein could be omitted. In other words, the descriptions of processes herein are provided for the purpose of illustrating certain embodiments of the diagrams and flowchart scheme and should in no way be construed so as to limit the claims.

Accordingly, it is to be understood that the above description is intended to be illustrative and not restrictive. Many embodiments and applications other than the examples provided would be apparent upon reading the above description. The scope should be determined as set forth above and may encompass multiple distinct inventions with independent utility. Although each of these inventions has been disclosed in its preferred form(s), the specific embodiments thereof as disclosed and illustrated herein are not to be considered in a limiting sense, because numerous variations are possible.

The subject matter of the inventions includes all novel and nonobvious combinations and sub-combinations of the various elements, features, functions, and/or properties disclosed herein. The following claims particularly point out certain combinations and sub-combinations regarded as novel and nonobvious and respectively features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A powered skateboard system comprising:
   a skateboard, said skateboard including:
   a deck having a top surface for supporting a rider/operator of the powered skateboard;
   a bottom surface configured to facilitate engagement with one or more inner-motorized trucks;
   a compartment situated in the bottom surface of the powered skateboard adapted to store one of more control system components and a cover configured to cover an opening formed by said compartment;
   said skateboard further comprising a control system, operation sensors, and control devices;
   said control system comprising control methodologies configured to monitor and control mechanical operations of said one or more inner-motorized trucks;
   said wireless controller device for controlling forward trajectory and braking momentum of said one or more inner-motorized trucks;
   a wireless transmitter configured to transmit information associated with the operation of said one or more inner-motorized trucks;
   a receiver configured to receive information associated with the operation of said one or more inner-motorized trucks;
   a safety mechanism kill switch to shut off power of said one or more inner-motorized truck's drive motors;
   one or more wire connections disposed within a conduit array situated between a power control device disposed within said one or more control system components of the powered skateboard system;
   one or more battery packs configured for a primary or a secondary back up power source of said powered skateboard system;
   a battery charging device and a battery charging controller associated with a charge level of said one or more battery packs used to power said one or more inner-motorized trucks;
   one or more motion control devices for controlling the steering and braking operations of said one or more inner-motorized truck drive motors of said powered skateboard.

2. The powered skateboard system of claim 1 in which a top surface of the power skateboard is configured for supporting a rider/operator.

3. The powered skateboard system of claim 1 in which further comprises a bottom surface of said powered skateboard being configured to facilitate engagement with one or more inner-motorized trucks; wherein said one or more inner-motorized trucks comprising; one or more hub wheels, wherein said one or more hub wheels comprising a drive motor, said one or more hub wheels further comprising one or more hub assemblies supported by a yoke module having a conduit arrangement.

4. The powered skateboard system of claim 1 in which a powered skateboard deck bottom portion comprises a compartment situated in the bottom surface of said powered skateboard deck, wherein said compartment adapted to store one of more control system components and control devices of said powered skateboard.

5. The powered skateboard system of claim 1 in which control system methodologies further comprising:

a plurality of said control devices including; operation sensors and microprocessors configured for controlling a power level directly furnished to said one or more drive motors of said inner-motorized truck;
said operation sensors and microprocessors providing controlled trajectory information of steering and braking momentum of said one or more drive motors, said steering and braking momentum information to be directly transmitted to said control system via said transmitter,
said control system configured for receiving trajectory information of a braking momentum information provided by said operation sensors,
said control system for controlling synchronized trajectory momentum of said one or more drive motors of said inner-motorized trucks,
said control system for controlling braking action of said one or more drive motors of said inner-motorized trucks,
said control system for controlling traverse steering actions to steer said one or more inner-motorized trucks of said powered skateboard.

6. The powered skateboard deck of claim 1 in which a powered skateboard deck portions having one of more wire connections disposed between a power control device of a powered skateboard control system and the inner-motorized truck.

7. The powered skateboard compartment of claim 1 in which a powered skateboard compartment having one or more battery packs configured for a primary and a secondary back up power source of the powered skateboard system.

8. The powered skateboard compartment of claim 1 in which a powered skateboard compartment comprising a removable compartment cover configured to cover the opening formed within the bottom surface of a powered skateboard deck.

9. The powered skateboard system of claim 1 in which a rider/operator of a powered skateboard utilizes a control system means including a handheld wireless control device, said handheld wireless control device for controlling the power of one or more inner-motorized powered skateboard trucks of said powered skateboard, said handheld wireless control device comprising a preferred make with wireless control system means.

10. The powered skateboard system of claim 1 in which a handheld wireless control device comprising:
   a transmitter and a receiver configured to transmit and to receive steering and braking information associated with the operation of the one or more inner-motorized trucks of said powered skateboard;
   said handheld wireless controller device configured for controlling the steering and braking operations of said one or more inner-motorized trucks of said powered skateboard.

11. The powered skateboard system of claim 1 in which a rider/operator of the powered skateboard utilizing a wireless phone device comprising:
   A controller for wirelessly controlling the steering operations of said one or more inner-motorized trucks of said powered skateboard;
   a controller for wirelessly controlling the braking operations of said one or more inner-motorized trucks of said powered skateboard;
   a controller for wirelessly controlling the power of said one or more inner-motorized trucks;

one or more touchscreen motion control devices for controlling the steering and braking operations of said one or more inner-motorized trucks of said powered skateboard;

said wireless phone device comprising a preferred make and shape configured having a wireless touchscreen controlling means.

12. The powered skateboard system of claim 1 in which the powered skateboard wireless phone device further comprising:
a wireless control system to wirelessly control the DC power of the one or more inner-motorized powered skateboard trucks wirelessly via said phone device comprising a touchscreen gesturing button controlling means;
a preferred make and shape to include microprocessors and sensors for controlling the trajectory momentum of said one or more inner-motorized powered skateboard trucks, or for controlling the braking actions and traverse steering actions to steer said one or more inner-motorized powered skateboard trucks of said powered skateboard;
a transmitter and a receiver configured to transmit information associated with the operations of said powered skateboard and one or more inner-motorized trucks;
said wireless phone touchscreen comprising motion control buttons and toggle switches for controlling the power to said one or more inner-motorized trucks;
a safety mechanism kill switch to shut off the power to said inner-motorized truck's drive motors of said one or more inner-motorized trucks.

13. The powered skateboard system of claim 1 further comprises a battery charging device, wherein said battery charging device is configured to receive information that is associated with a charge level of a battery used to power the one or more inner-motorized trucks, wherein said battery configured with an outer case, said battery pack being removable from the battery compartment when the battery pack has been depleted, respectively said battery pack to be exchanged for a fully charged auxiliary battery pack.

14. A powered skateboard comprising:
a skateboard deck configured with a top surface for supporting a rider/operator;
a bottom surface to facilitate engagement with one or more inner-motorized trucks and attaching an inner-motorized hub wheel to the skateboard truck;
a compartment configured within a bottom portion of the skateboard and a removable compartment cover configured to cover the opening formed by the compartment surface;
at least one compartment for storing one or more control components; an array of electrical wire and connections;
a control system configured to for controlling said powered skateboard components;
one or more batteries configured to provide power to said inner-motorized truck's hub wheel; a battery charging controller associated with a charge level of a battery;
said one or more inner-motorized trucks wirelessly connected with a phone device with touchscreen gesturing control means;
a handheld controller device comprising a preferred make with wireless control system means;
a powered skateboard control system configured to, at least, control said inner-motorized truck drive motors based on a control signal received through a transceiver by means of said one or more sensors;
one or more motion control devices to monitor vibration and motion of mechanical operations of said inner-motorized truck, and a control device configured to systematically control the speed and braking momentum of one or more drive motors;
said powered skateboard arrangement comprised of: screws, adhesive, welding, and mechanically fastening via a securing means;
an inner-motorized truck configured with an inflated tire or non-inflated tire composite mounted about the rim of a hub wheel;
said hub wheel comprising a drive motor including an arrangement of gear types, axle rods, hubs, bearings, and a bolting means;
an inner-motorized truck configured with drive motor supported by at least one axle rod and at least one hub of a hub configured to attach to a yoke module;
a motion sensor to monitor inner-motorized truck motion states;
a hollow conduit to facilitate passage of an electrical wire with connections there through, and one or more wire connections disposed within a conduit array situated between the power control device and said control components of said powered skateboard compartment;
said yoke module arranged to attach to the hub wheel assembly respectively by means of one or more lug bolts;
a drive motor, said drive motor preferably enclosed within the body of a hub wheel;
a truck configured having a wide axle supporting two opposing electric powered hub wheels having linear motion perpendicular to an axis of rotation parallel to an oblique angle with the gravity line.

* * * * *